US010868357B2

(12) United States Patent
Dogiamis et al.

(10) Patent No.: US 10,868,357 B2
(45) Date of Patent: Dec. 15, 2020

(54) MASSIVE ANTENNA ARRAY ARCHITECTURE FOR BASE STATIONS DESIGNED FOR HIGH FREQUENCY COMMUNICATIONS

(71) Applicant: Intel Corporation, Santa Clara, CA (US)

(72) Inventors: Georgios C. Dogiamis, Chandler, AZ (US); Sasha N. Oster, Chandler, AZ (US); Telesphor Kamgaing, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/344,717

(22) PCT Filed: Dec. 14, 2016

(86) PCT No.: PCT/US2016/066716
§ 371 (c)(1),
(2) Date: Apr. 24, 2019

(87) PCT Pub. No.: WO2018/111267
PCT Pub. Date: Jun. 21, 2018

(65) Prior Publication Data
US 2019/0334227 A1    Oct. 31, 2019

(51) Int. Cl.
*H01Q 1/24* (2006.01)
*H01Q 1/02* (2006.01)
*H01Q 1/38* (2006.01)
*H04W 88/08* (2009.01)
*H01Q 21/00* (2006.01)

(52) U.S. Cl.
CPC ............ *H01Q 1/246* (2013.01); *H01Q 1/02* (2013.01); *H01Q 1/38* (2013.01); *H04W 88/08* (2013.01); *H01Q 21/0025* (2013.01)

(58) Field of Classification Search
CPC .......... H01Q 1/246; H01Q 1/02; H01Q 1/38; H01Q 21/0025; H04W 88/08
See application file for complete search history.

(56) References Cited

U.S. PATENT DOCUMENTS 6,441,793 B1 *   8/2002   Shea ................... H01Q 13/065
                                                              343/753
2008/0159243 A1  7/2008   Rofougaran
(Continued)

OTHER PUBLICATIONS

International Search Report and Written Opinion for International Patent Application No. PCT/US2016/066716 dated Sep. 8, 2017, 10 pgs.
(Continued)

Primary Examiner — Nguyen T Vo
(74) Attorney, Agent, or Firm — Schwabe, Williamson & Wyatt, P.C.

(57) ABSTRACT

Embodiments of the invention include a base station that includes a central transceiver unit (CTU) having a plurality of transceiver cores and a substrate. A printed circuit board (PCB) supports the substrate and at least one antenna unit is coupled to the PCB with at least one of a cable and a waveguide. The at least one antenna unit transmits and receives communications at a frequency of approximately 4 GHz or higher.

23 Claims, 4 Drawing Sheets

(56) References Cited

U.S. PATENT DOCUMENTS

| | | | |
|---|---|---|---|
| 2010/0054163 A1* | 3/2010 | Loyet | H01P 5/12 |
| | | | 370/282 |
| 2011/0057741 A1 | 3/2011 | Dayan et al. | |
| 2014/0071018 A1* | 3/2014 | Pan | H01Q 1/20 |
| | | | 343/867 |
| 2014/0201329 A1* | 7/2014 | Himayat | H04L 12/6418 |
| | | | 709/219 |
| 2014/0361854 A1 | 12/2014 | Kim et al. | |
| 2015/0364830 A1* | 12/2015 | Tong | H01Q 19/10 |
| | | | 342/27 |
| 2016/0127003 A1 | 5/2016 | Xu et al. | |
| 2017/0346168 A1* | 11/2017 | Schwartzman | H04W 88/085 |
| 2018/0007697 A1* | 1/2018 | Tolochko | H04W 16/14 |

OTHER PUBLICATIONS

D. Rodrigo et al., 'MEMS-reconfigurable antenna based on a multi-size pixelled geometry', Antennas and Propagation (EuCAP), 2010 Proceedings of the Fourth European Conference on Jul. 8, 2010, 5 pgs.

* cited by examiner

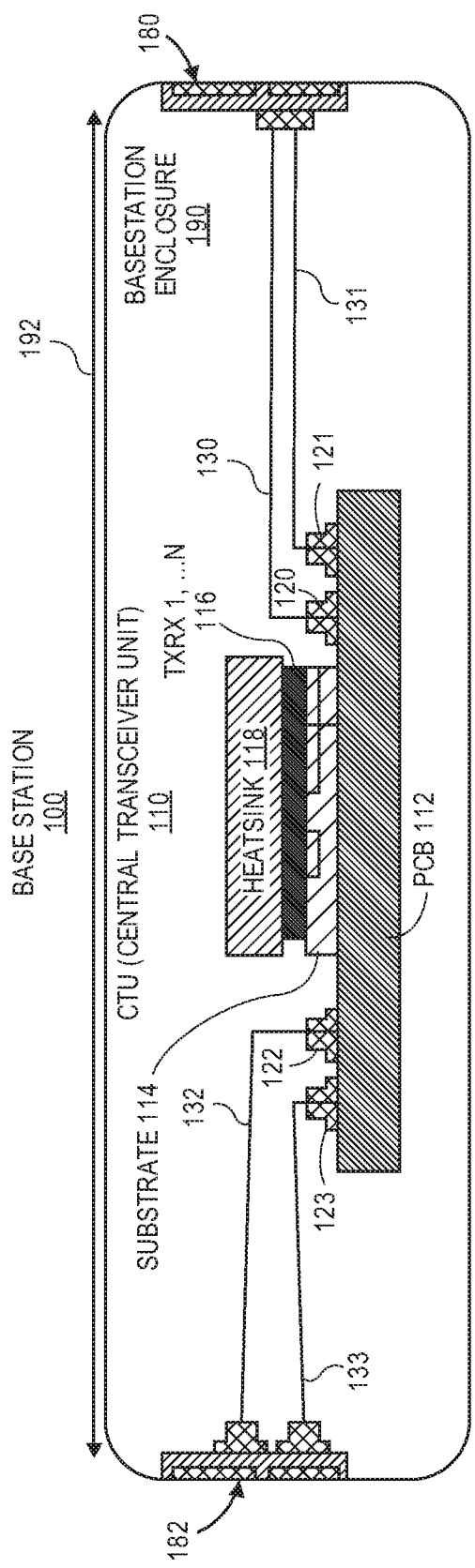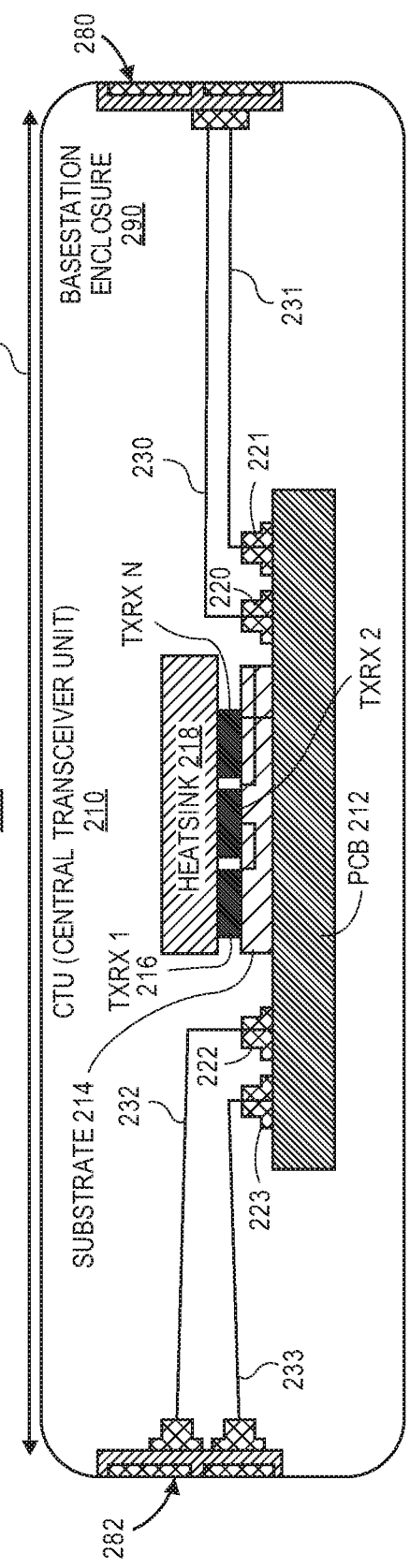

MASSIVE ANTENNA ARRAY ARCHITECTURE FOR BASE STATIONS DESIGNED FOR HIGH FREQUENCY COMMUNICATIONS

CROSS-REFERENCE TO RELATED APPLICATION

This patent application is a U.S. National Phase Application under 35 U.S.C. § 371 of International Application No. PCT/US2016/066716, filed Dec. 14, 2016, entitled "MASSIVE ANTENNA ARRAY ARCHITECTURE FOR BASE STATIONS DESIGNED FOR HIGH FREQUENCY COMMUNICATIONS," which designates the United States of America, the entire disclosure of which is hereby incorporated by reference in its entirety and for all purposes.

FIELD OF THE INVENTION

Embodiments of the present invention relate generally to the manufacture of semiconductor devices. In particular, embodiments of the present invention relate to massive antenna array architecture for base stations designed for high frequency communications.

BACKGROUND OF THE INVENTION

Future wireless products are targeting operation frequencies much higher than the lower GHz range utilized presently. For instance 5G ($5^{th}$ generation mobile networks or 5th generation wireless systems) communications is expected to operate at a frequency greater than or equal to 15 GHz (e.g., millimeter wave frequencies (e.g., 30 GHz-300 GHz). Moreover, the current WiGig (Wireless Gigabit Alliance) products operate around 60 GHz. Current cellular networks rely on a single base station (tower) serving a large number of users. Base stations are spaced with many hundreds of meters of pitch. In the $4^{th}$ generation (aka 4G) mobile and wireless standards, the network is hierarchical and subdivided into several levels: macro cells are supported by cell phone towers and can cover distances up to a mile with reasonable data throughput. Large cells cover shorter distances and are typically deployed in heavily populated cities where demand for data may be high or in areas, where the wave propagation is limited by tall impenetrable buildings. Finally pico and nano cells may be used for customers in macro cell transition areas, where the signal is typically too weak. For 5G mobile and wireless communication, the traditional macro cells will not be able to sustain the anticipated demand for data, hence a major revolution in the network architecture will consist of network densification by introducing small cells that can provide up to 50 Gbps peak datarate. It is anticipated that such cells may be spaced (center to center) in distances of about 50 meters to 200 meters. This sets a new demand for base station transceivers and their overall architectures.

BRIEF DESCRIPTION OF THE DRAWINGS

FIG. 1 illustrates a base station for high frequency communications in accordance with one embodiment.

FIG. 2 illustrates a base station for high frequency communications in accordance with one embodiment.

DETAILED DESCRIPTION OF THE INVENTION

Figure 3:
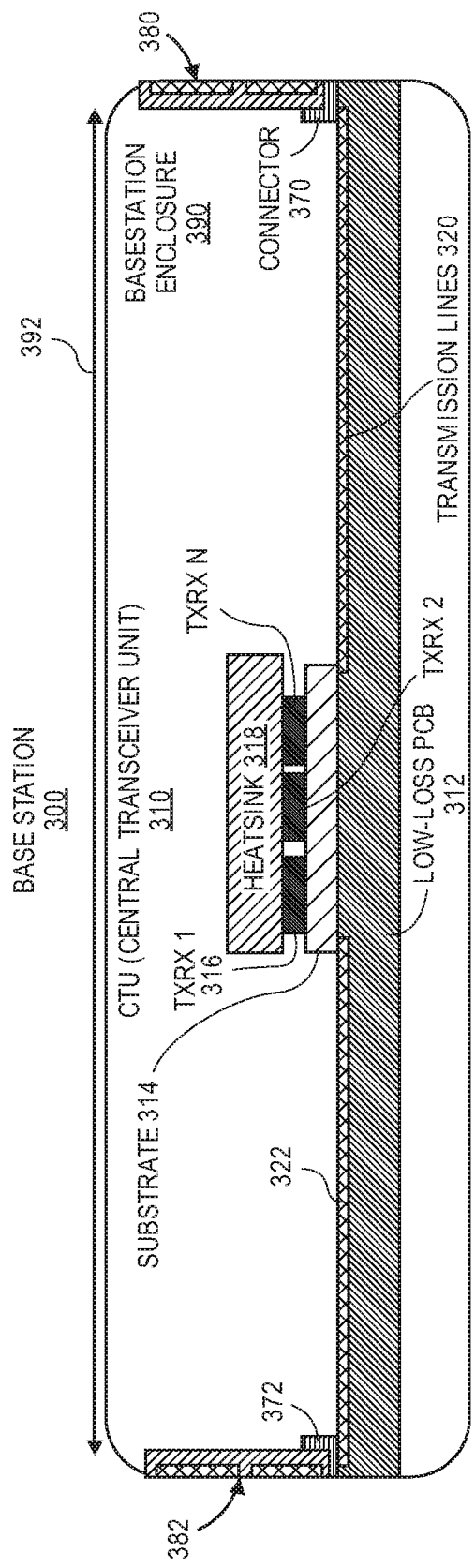
FIG. 3 illustrates a base station with a low loss PCB for high frequency communications in accordance with one embodiment.

Described herein are massive antenna array architectures with base stations designed for high frequency communications. In the following description, various aspects of the illustrative implementations will be described using terms commonly employed by those skilled in the art to convey the substance of their work to others skilled in the art. However, it will be apparent to those skilled in the art that embodiments of the present invention may be practiced with only some of the described aspects. For purposes of explanation, specific numbers, materials and configurations are set forth in order to provide a thorough understanding of the illustrative implementations. However, it will be apparent to one skilled in the art that embodiments of the present invention may be practiced without the specific details. In other instances, well-known features are omitted or simplified in order to not obscure the illustrative implementations.

Various operations will be described as multiple discrete operations, in turn, in a manner that is most helpful in understanding embodiments of the present invention, however, the order of description should not be construed to imply that these operations are necessarily order dependent. In particular, these operations need not be performed in the order of presentation. The network architecture of future 5G systems is expected to include a heterogeneous network incorporating diverse technologies such as massive multiple-input and multiple-output (MIMO) and millimeter wave communications. The communication range within future 5G small cells is expected to be limited to a maximum of 250 meters at peak performance and 500 meters for moderate performance, hence the communication concept relies on many small base stations units that will be closely spaced to each other.

For high frequency (e.g., 5G, WiGig) wireless applications of millimeter (e.g., 1-10 mm, any mm wavelength) wave communication systems, new base station concepts have to be designed and architected, since the operation frequencies are much higher than today's 4G (<5 GHz) systems. Moreover, antennas for 5G systems operating at 24 GHz and above are expected to be highly directional and utilize phased array concepts, which needs to be taken into consideration when architecting a base station. Base stations are expected to use several of such antennas to spatially cover the entire communication space and also support MIMO operation.

The base station architecture of the present design includes a central transceiver unit with enhanced thermal solution. The antennas are arranged in a satellite around the central transceiver unit and connected to the central transceiver unit using coaxial cables or other low loss mm-wave waveguides. The Central Transceiver Unit (CTU) can include one large transceiver (TRx) die (with many TRx cores) or several smaller TRx dies that are integrated together on a single or multiple microelectronic package substrate. This CTU can have one enhanced thermal solution for a thermal challenge that occurs with higher frequencies due to the output power of the transistors being reduced and the power amplifiers becoming less efficient. This means substantial power has to be dissipated by the power amplifiers to meet the output power and transmission range requirements. This power dissipation increases substantially with a combination of phased arrays and massive MIMOs.

An advantage of this architecture is the use of an enhanced thermal solution, instead of having several TRxs distributed with their dedicated thermal solution. Moreover, the antenna architecture is fully decoupled from the central transceiver unit, allowing third party entities to design their custom antennas or allowing them to co-design base-station enclosure and antennas. The present design results in lower costs by only assembling one thermal solution on top of the centralized TRx core unit. The present design results in an enhanced thermal management of the CTU. The present design integrates massive MIMOs for 5G and beyond base stations.

The present design can include high frequency components (e.g., 5G transceiver) and utilize non-CMOS technologies (e.g., non-silicon substrates) for critical parts of a communication system (e.g., GaAs, GaN, Passives-on-Glass, etc.). Critical parts requiring high efficiencies and high quality factors can be fabricated on another technology (e.g., compound semiconductor materials, group III-V materials).

FIG. 1 illustrates a base station for high frequency communications in accordance with one embodiment. The base station 100 having a length dimension 192 (e.g., length of at least 1 foot) includes a central transceiver unit 110 that includes a PCB 112, a microelectronic package substrate 114, a transceiver die 116 having a plurality of transceiver cores (e.g., 1, 2, . . . n), and a heat sink 118 for distributing heat from the transceiver cores. An optional fan may also be included in the base station for additional thermal cooling. In one example, the transceiver die includes up to 20 transceiver cores and the central transceiver unit 100 has dimensions of approximately 10 mm×10 mm. The substrate 114 (e.g., silicon substrate, silicon substrate having resistivity more than 1 ohm cm, group III-V substrate, organic material substrate, etc.) provides support for the transceiver cores (e.g., digital circuitry, baseband circuitry, processors, application processors, and at least one transceiver unit, GaN components, GaN devices, GaN circuitry, high output power transistors, RF circuitry, a combiner, a switch, power amplifier, individual devices (e.g., transistors), any type of device or circuitry formed in compound semiconductor materials, etc.). The transceiver cores can be integrated with the substrate 114 with semiconductor fabrication processes or the transceiver cores can be assembled on the substrate 114 (e.g., organic material substrate 114). For example, these components may be grown monolithically on the substrate 114. In another example, these components may be fabricated with a different process (e.g., GaAs, GaN, etc.) and then attached to the substrate 114 (or embedded within cavities of the substrate) at the beginning, during, or at the end of the processing for the substrate 114.

In one example, the substrate 114 includes baseband dies and network interface circuitries that are packaged on the package substrate 114 or the baseband dies and network interface circuitries are included on a different package substrate. The baseband die and the network interface die may also have their own thermal solution.

In another example, direct chip attach (DCA) is performed to attach chips on the PCB and the substrate 114 is no longer required. Alternatively, the components may be distributed such that those with small FLI pitch are on substrate 114 and those with large FLI pitch are attached directly on the PCB.

Connectors 120-123 (e.g., SMA connectors, 2.92 mm connectors) and cables (e.g., coaxial, twinaxial) or dielectric waveguides 130-133 transmit communications between the PCB 112 and antenna packages or units 180 and 182.

Please note that different connectors can be used than the connectors illustrated in FIG. 1. Connectors using a custom interface can be used as well. Coaxial RF cables can have a very low loss (e.g., ~3-5 dB/m) for carrying such signals up to 30 GHz. Another way to reduce losses, would be the use of waveguides (e.g., air core, or dielectric waveguides). Connectors are also used as shown if the length of the final enclosure 190 is too long to use the PCB for routing out the mm Wave signals. This will also relax the material selection on the PCB side, since the use of low loss materials might not be imperative in that case. Antenna packages or units 180 and 182 can be integrated on the periphery of the base station 100 housing and be connected to the CTU 110 via the cables/WGs as mentioned above. Therefore, the antenna design is fully decoupled from the CTU and does not impose limitations to the third party entities that are designing their base stations.

In another example, an active antenna can be integrated with the CTU. The active antenna includes at least one active die, which can be a sub-section of the receiver and transmitter circuitry chains.

In one example, components of an antenna package or unit 180 and 182 which primarily dominate a packaging area are partitioned in a separate lower cost and lower circuit density substrate in comparison to the microelectronic package substrate 114, which may have high density interconnect (HDI) and impedance controlled interconnect. A substrate of the antenna package may be formed with low temperature co-fired ceramic materials, liquid crystal polymers, organic materials, glass, undoped silicon, etc. HDI PCB technologies may include blind and/or buried via processes and possibly microvias with a higher circuit density than traditional PCBs. The substrate 114 may be formed with any materials (e.g., low resistivity silicon based substrates, materials for formation of CPUs, Semi-insulating substrate like GaAs, high resistivity silicon substrate, etc.) that are designed for high frequency designs having desirable high frequency characteristics (e.g., substrate loss, dielectric constant).

FIG. 2 illustrates a base station for high frequency communications in accordance with one embodiment. The base station 200 having a length dimension 292 (e.g., length of at least 1 foot) includes a central transceiver unit 200 that includes a PCB 212, a substrate 214, a plurality of transceiver dies 216 having a plurality of transceiver cores (e.g., 1, 2, . . . n), and a heat sink 218 for distributing heat from the transceiver cores. An optional fan may also be included in the base station for additional thermal cooling. In one example, the transceiver die includes up to 20 transceiver cores and the central transceiver unit 200 has dimensions of approximately 10 mm×10 mm. The substrate 214 (e.g., silicon substrate, silicon substrate having resistivity more than 1 ohm cm, group III-V substrate, organic material substrate, etc.) provides support for the transceiver cores (e.g., digital circuitry, baseband circuitry, processors, application processors, and at least one transceiver unit, GaN components, GaN devices, GaN circuitry, high output power transistors, RF circuitry, a combiner, a switch, power amplifier, individual devices (e.g., transistors), any type of device or circuitry formed in compound semiconductor materials, etc.). The transceiver cores can be integrated with the substrate 214 with semiconductor fabrication processes or the transceiver cores can be assembled on the substrate 214 (e.g., organic material substrate 214). For example, these components may be grown monolithically on the substrate 214. In another example, these components may be fabricated with a different process (e.g., GaAs, GaN, etc.) and then attached to the substrate 214 (or embedded within cavities of the substrate) at the beginning, during, or at the end of the processing for the substrate 214.

In one example, the substrate 214 includes baseband dies and network interface circuitries that are packaged on the package substrate 214 or the baseband dies and network interface circuitries are included on a different package substrate. The baseband die and the network interface die may also have their own thermal solution.

In another example, direct chip attach (DCA) is performed to attach chips on the PCB and the substrate 214 is no longer required. Alternatively, the components may be distributed such that those with small FLI pitch are on substrate 214 and those with large FLI pitch are attached directly on the PCB.

Connectors 220-223 (e.g., SMA connectors, 2.92 mm connectors) and cables (e.g., coaxial, twinaxial) or dielectric waveguides 230-233 transmit communications between the PCB 212 and antenna packages or units 280 and 282.

Please note that different connectors can be used than the connectors illustrated in FIG. 2. Connectors using a custom interface can be used as well. Coaxial RF cables can have a very low loss (e.g., ~3-5 dB/m) for carrying such signals up to 30 GHz. Another way to reduce losses, would be the use of waveguides (e.g., air core, or dielectric WGs). Connectors are also used as shown if the length of the final enclosure 290 is too long to use the PCB for routing out the mm Wave signals.

In another example, an active antenna can be integrated with the CTU.

FIG. 3 illustrates a base station (e.g., small cell base station) with a low loss PCB for high frequency communications in accordance with one embodiment. The base station 300 having a length dimension 392 (e.g., length less than 1 foot) includes a central transceiver unit 300 that includes a low loss PCB 212, a substrate 314, a plurality of transceiver dies 316 having a plurality of transceiver cores (e.g., 1, 2, . . . n), and a heat sink 318 for distributing heat from the transceiver cores. An optional fan may also be included in the base station for additional thermal cooling. In one example, the transceiver die includes up to 20 transceiver cores and the central transceiver unit 300 has dimensions of approximately 10 mm×10 mm. The substrate 314 (e.g., silicon substrate, silicon substrate having resistivity more than 1 ohm cm, group III-V substrate, organic material substrate, etc.) provides support for the transceiver cores (e.g., digital circuitry, baseband circuitry, processors, application processors, and at least one transceiver unit, GaN components, GaN devices, GaN circuitry, high output power transistors, RF circuitry, a combiner, a switch, power amplifier, individual devices (e.g., transistors), any type of device or circuitry formed in compound semiconductor materials, etc.). The transceiver cores can be integrated with the substrate 314 with semiconductor fabrication processes or the transceiver cores can be assembled on the substrate 314 (e.g., organic material substrate 314). For example, these components may be grown monolithically on the substrate 314. In another example, these components may be fabricated with a different process (e.g., GaAs, GaN, etc.) and then attached to the substrate 314 (or embedded within cavities of the substrate) at the beginning, during, or at the end of the processing for the substrate 314.

In one example, the substrate 114 includes baseband dies and network interface circuitries that are packaged on the package substrate 114 or the baseband dies and network interface circuitries are included on a different package substrate. The baseband die and the network interface die may also have their own thermal solution.

In another example, direct chip attach (DCA) is performed to attach chips on the PCB and the substrate 114 is no longer required. Alternatively, the components may be distributed such that those with small FLI pitch are on substrate 114 and those with large FLI pitch are attached directly on the PCB. The PCB 312 routes the mm Wave communications from the transceiver cores to edges of the base station having antenna packages or units. Thus, the PCB 312 includes low loss materials (e.g., flame retardant 4 (FR4), resin-filled polymers, prepreg (e.g., pre impregnated, fiber weave impregnated with a resin bonding agent), polymers, silica-filled polymers, etc.) Transmission lines 320 and 322 (or grounded coplanar waveguides) transmit communications between the PCB 312 and antenna packages or units 380 and 382. A predefined interface (e.g., connectors 370 and 372) electrically couples the transmission lines to conductive layers of the antenna packages or units. The antenna packages or units may be pluggable into the predefined interface. The interface may also include a very short flexible cable or waveguide. In one example, the transmission lines 320 and 322 (e.g. grounded coplanar waveguides) have a loss of 0.4 to 1.5 dB/cm.

Please note that different connectors (e.g., 2.4 mm, 1.85 mm, 1.0 mm, edge mounted, surface mounted connectors) can be used than the connectors illustrated in FIG. 3. Connectors using a custom interface can be used as well. The antenna design is fully decoupled from the CTU and does not impose limitations to the third party entities that are designing their base stations.

The components (e.g., base station enclosure, CTU, heat sink, transceiver cores, substrate, PCB, transmission lines, etc.) can have a different thickness, length, and width dimensions in comparison to thickness, length, and width dimensions as illustrated in FIGS. 1-3.

In one example, for a wavelength of 10-1 mm, a frequency of approximately 30-300 GHz, a base station is capable of approximately 10 Gbps data rates and approximately 1 kilometer line of sight range. A base station may be a separate component or integrated with other components (e.g., 5G router, WiFi router, etc.).

The antenna units shown in FIG. 1-3 are arrays on different sides of the housing of the base station. In addition, the cables may be cable bundles connecting between the transceiver cores and multiple antenna elements or sub arrays. The sub arrays can be fixed beam antennas to limit the number of cables in the system. Each sub array with fixed beam is designed to cover a designated space.

It will be appreciated that, in a system on a chip embodiment, the die may include a processor, memory, communications circuitry and the like. Though a single die is illustrated, there may be none, one or several dies included in the same region of the wafer.

In one embodiment, the microelectronic device (e.g., the active circuits in the different dies, CTU) may be a crystalline substrate formed using a bulk silicon or a silicon-on-insulator substructure. In other implementations, the microelectronic device may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. Although a few examples of materials from which the substrate may be formed are described here, any material that may serve as a foundation upon which a semiconductor device may be built falls within the scope of embodiments of the present invention.

Figure 4:
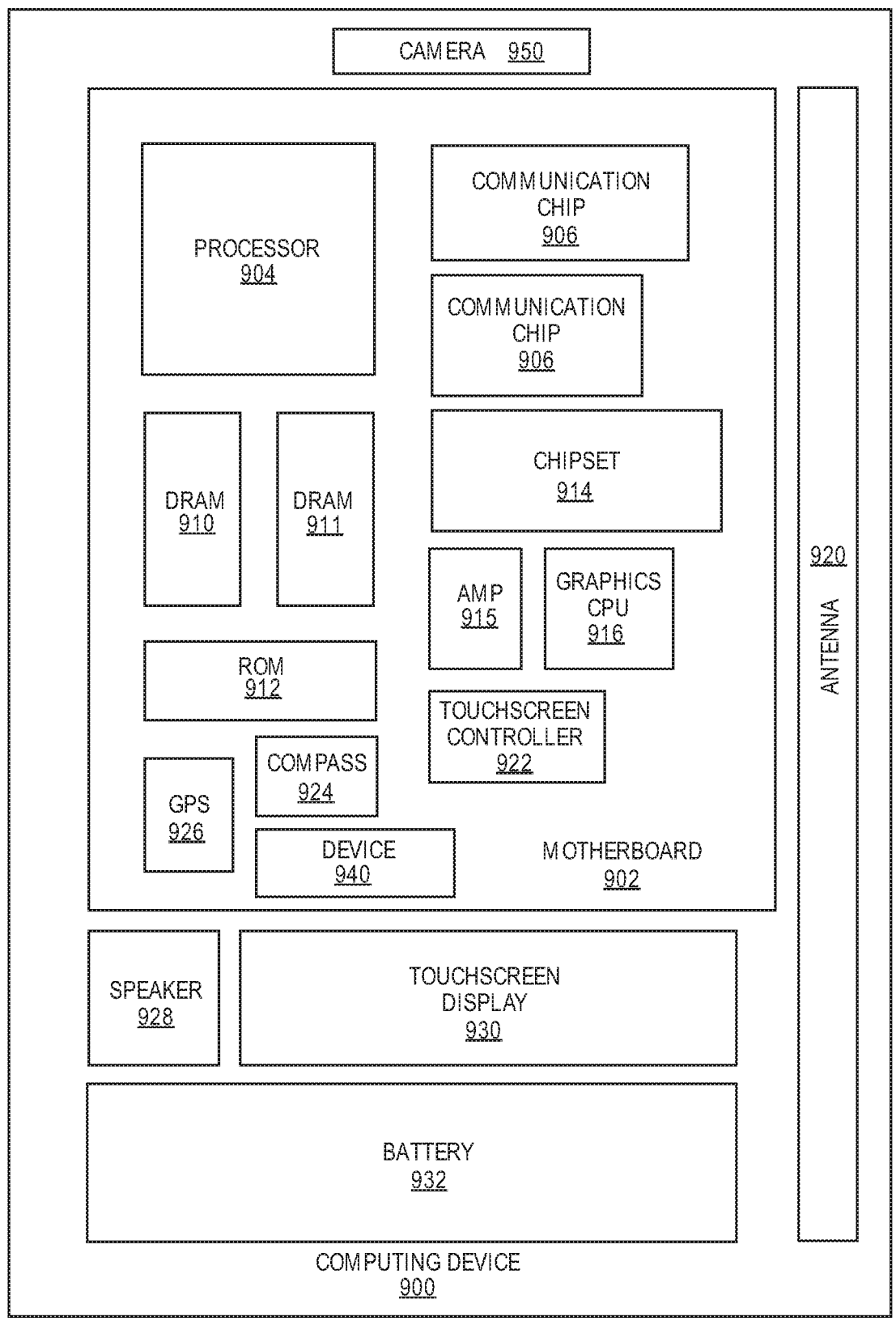
FIG. 4 illustrates a computing device 900 in accordance with one embodiment.

FIG. 4 illustrates a computing device 900 in accordance with one embodiment. The computing device 900 houses a board 902. The board (e.g., motherboard, printed circuit board, etc.) may include a number of components, including but not limited to at least one processor 904 and at least one communication chip 906. The at least one processor 904 is physically and electrically coupled to the board 902. In some implementations, the at least one communication chip 906 is also physically and electrically coupled to the board 902. In further implementations, the communication chip 906 is part of the processor 904. In one example, the communication chip 906 (e.g., CTU 110, 210, 310, etc.) is communicatively coupled to an antenna unit 920 (e.g., antenna unit 180, 182, 280, 282, 380, 382, etc.).

Depending on its applications, computing device 900 may include other components that may or may not be physically and electrically coupled to the board 902. These other components include, but are not limited to, volatile memory (e.g., DRAM 910, 911), non-volatile memory (e.g., ROM 912), flash memory, a graphics processor 916, a digital signal processor, a crypto processor, a chipset 914, an antenna unit 920, a display, a touchscreen display 930, a touchscreen controller 922, a battery 932, an audio codec, a video codec, a power amplifier 915, a global positioning system (GPS) device 926, a compass 924, a gyroscope, a speaker, a camera 950, and a mass storage device (such as hard disk drive, compact disk (CD), digital versatile disk (DVD), and so forth).

The communication chip 906 enables wireless communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 906 may implement any of a number of wireless standards or protocols, including but not limited to Wi-Fi (IEEE 802.11 family), WiMAX (IEEE 802.16 family), WiGig, IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 900 may include a plurality of communication chips 906. For instance, a first communication chip 906 may be dedicated to shorter range wireless communications such as Wi-Fi, WiGig, and Bluetooth and a second communication chip 906 may be dedicated to longer range wireless communications such as GPS, EDGE, GPRS, CDMA, WiMAX, LTE, Ev-DO, 5G, and others.

The at least one processor 904 of the computing device 900 includes an integrated circuit die packaged within the at least one processor 904. In some embodiments of the invention, the integrated circuit die of the processor includes one or more devices, such as microelectronic devices (e.g., CTU 110, 210, 310, etc.) in accordance with implementations of embodiments of the invention. The term "processor" may refer to any device or portion of a device that processes electronic data from registers and/or memory to transform that electronic data into other electronic data that may be stored in registers and/or memory.

The communication chip 906 also includes an integrated circuit die packaged within the communication chip 906. In accordance with another implementation of embodiments of the invention, the integrated circuit die of the communication chip includes one or more microelectronic devices 940 (e.g., CTU 110, 210, 310, etc.).

The base stations of the present design cover different cell sizes (e.g., micro cell, small cell, pico cell, etc.) with a cell being an area within which data exchange between a base station and a mobile device (or other type of communication device) meets certain predefined performance requirements. This may include data rate, latency, efficiency, etc. For 5G communications, a small cell may cover up to 100 meters with 50 Gpbs peak data rate and a pico cell may only cover a small residential house. A macro cell and large cell may cover up to a mile.

Figure 5:
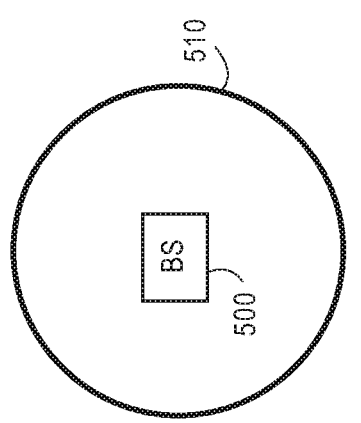
FIG. 5 illustrates a base station 500 and associated cell in accordance with one embodiment.

FIG. 5 illustrates a base station 500 and associated cell in accordance with one embodiment. The base station 500 can provide 5G communications with mobile devices that are located within the cell 510.

Figure 6:
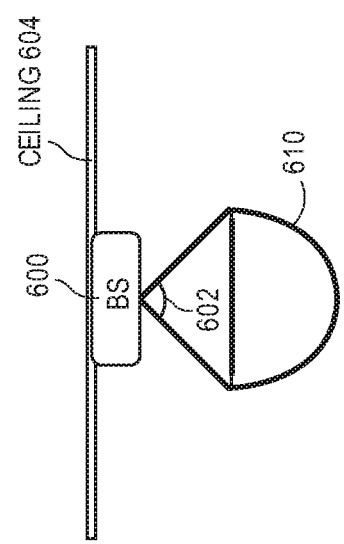
FIG. 6 illustrates a base station 600 with a highly directional antenna in accordance with one embodiment.

FIG. 6 illustrates a base station 600 with a highly directional antenna in accordance with one embodiment. The base station 600 can provide 5G communications with mobile devices that are located within the cell 610. A cell size is limited by free space attenuation and steering angle 602 of the phased antenna array used in the base station 600. The base station 600 can be mounted to different types of surfaces including a ceiling 604.

Figure 7:
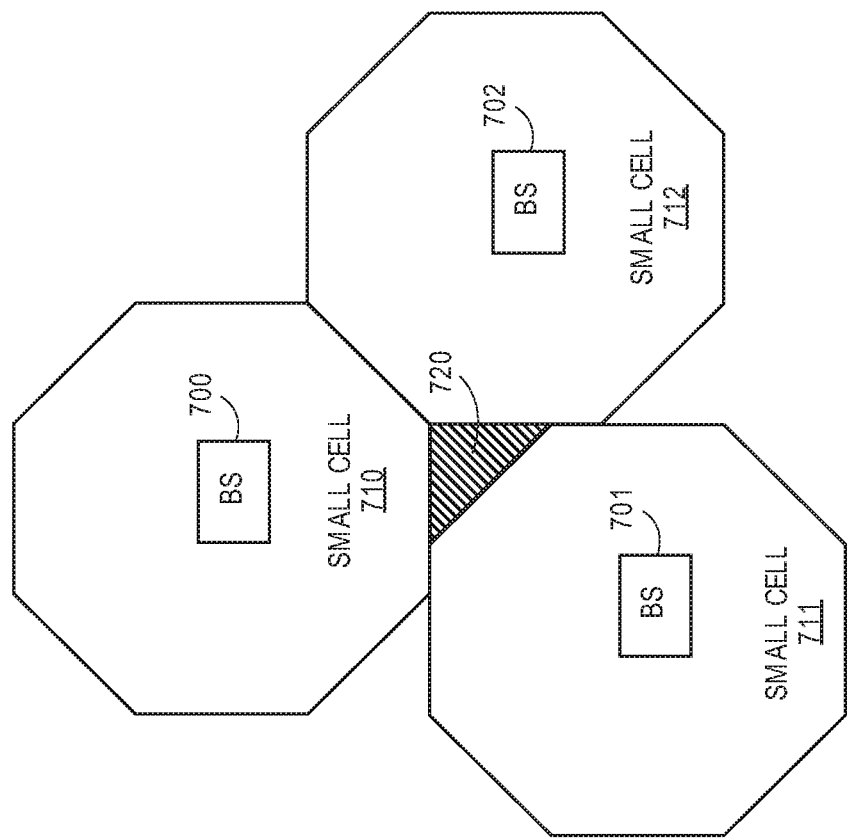
FIG. 7 illustrates base stations and associated small cells in accordance with one embodiment.

FIG. 7 illustrates base stations and associated small cells in accordance with one embodiment. The base stations 700-702 can provide 5G communications with mobile devices that are located within the small cells 710-712. Each small cell is associated with a base station. In one example, a region 720 is a dead spot with no 5G coverage because the region 720 is not covered by any of the small cells. Cell shape and size may also be dependent on the size and orientation of antennas within the base stations.

The following examples pertain to further embodiments. Example 1 is a microelectronic device that includes a base station comprising a central transceiver unit (CTU) that includes a plurality of transceiver cores and a substrate, a printed circuit board (PCB) to support the substrate, and at least one antenna unit coupled to the PCB with at least one of a cable and a waveguide. The at least one antenna unit to transmit and receive communications at a frequency of approximately 4 GHz or higher.

In example 2, the subject matter of example 1 can optionally include a base station enclosure to enclose the base station and to position the at least one antenna unit near a periphery of the base station, at least one baseband circuitry, and network interface circuitry.

In example 3, the subject matter of any of examples 1-2 can optionally include the at least one antenna unit being physically separated from the CTU package and the PCB.

In example 4, the subject matter of any of examples 1-3 can optionally include the plurality of transceiver cores being located on a single transceiver die.

In example 5, the subject matter of any of examples 1-3 can optionally include the plurality of transceiver cores being located on a plurality of transceiver dies.

In example 6, the subject matter of any of examples 1-5 can optionally include the at least one antenna unit to transmit and receive communications at a frequency of approximately 24 GHz or higher.

In example 7, the subject matter of any of examples 1-6 can optionally include a heat sink coupled to the plurality of transceiver cores. The heat sink provides thermal management for the plurality of transceiver cores of the CTU.

In example 8, the subject matter of any of examples 1-7 can optionally include the base station comprising a 5G base station for 5G communications.

Example 9 is a base station comprising a central transceiver unit (CTU) that includes a plurality of transceiver cores and a substrate, a printed circuit board (PCB) to support the substrate, and at least one antenna unit coupled to the PCB with at least one transmission line, the at least one antenna unit to transmit and receive communications at a frequency of approximately 4 GHz or higher.

In example 10, the subject matter of example 9 can optionally include a base station enclosure to enclose the base station and to position the at least one antenna unit near a periphery of the base station, at least one baseband circuitry, and network interface circuitry.

In example 11, the subject matter of any of examples 9-10 can optionally include the at least one antenna unit being physically separated from the CTU package substrate and the at least one antenna unit being capable of being plugged into a predefined interface of the PCB.

In example 12, the subject matter of any of examples 9-11 can optionally include the plurality of transceiver cores being located on a single transceiver die.

In example 13, the subject matter of any of examples 9-11 can optionally include the plurality of transceiver cores being located on a plurality of transceiver dies.

In example 14, the subject matter of any of examples 9-13 can optionally include the at least one antenna unit to transmit and receive communications at a frequency of approximately 24 GHz or higher.

In example 15, the subject matter of any of examples 9-14 can optionally include a heat sink coupled to the plurality of transceiver cores. The heat sink provides thermal management for the plurality of transceiver cores of the CTU.

In example 16, the subject matter of any of examples 9-15 can optionally include the base station comprising a 5G base station for 5G communications.

Example 17 is a computing device comprising at least one processor to process data and a communication module or chip coupled to the at least one processor. The communication module or chip comprises a central transceiver unit (CTU) that includes a plurality of transceiver cores and a substrate, a printed circuit board (PCB) to support the substrate, and at least one antenna unit coupled to the PCB with at least one transmission line. The at least one antenna unit to transmit and receive communications at a frequency of approximately 4 GHz or higher.

In example 18, the subject matter of example 17 can optionally include an enclosure to enclose the computing device and to position the at least one antenna unit near a periphery of the computing device, at least one baseband circuitry, and network interface circuitry.

In example 19, the subject matter of any of examples 17-18 can optionally include the at least one antenna unit being physically separated from the CTU and the at least one antenna unit being capable of being plugged into a predefined interface of the PCB.

In example 20, the subject matter of any of examples 17-19 can optionally include the at least one antenna unit to transmit and receive communications at a frequency of approximately 24 GHz or higher.

In example 21, the subject matter of any of examples 17-20 can optionally include a heat sink coupled to the plurality of transceiver cores. The heat sink to provide thermal management for the plurality of transceiver cores of the CTU.

In example 22, the subject matter of any of examples 17-21 can optionally include the computing device comprising a 5G base station for 5G communications.

In example 23, the subject matter of any of examples 17-22 can optionally include the at least one transmission line comprising a grounded coplanar waveguide.

What is claimed is:

1. A base station comprising:
    a central transceiver unit (CTU) that includes a plurality of transceiver cores and a substrate;
    a printed circuit board (PCB) to support the substrate, wherein the substrate is between the plurality of transceiver cores and the PCB; and
    at least one antenna unit coupled to the PCB with at least one of a cable or a waveguide, the at least one antenna unit to transmit and receive communications at a frequency of approximately 4 GHz or higher, wherein the at least one of the cable or the waveguide is coupled directly to the PCB.

2. The base station of claim 1 further comprising:
    a base station enclosure to enclose the base station and to position the at least one antenna unit near a periphery of the base station; at least one baseband circuitry; and network interface circuitry.

3. The base station of claim 2, wherein the at least one antenna unit is physically separated from the CTU and the PCB.

4. The base station of claim 1, wherein the plurality of transceiver cores are located on a single transceiver die.

5. The base station of claim 1, wherein the plurality of transceiver cores are located on a plurality of transceiver dies.

6. The base station of claim 1 wherein the at least one antenna unit to transmit and receive communications at a frequency of approximately 24 GHz or higher.

7. The base station of claim 1, further comprising:
    a heat sink coupled to the plurality of transceiver cores, the heat sink to provide thermal management for the plurality of transceiver cores of the CTU.

8. The base station of claim 1, wherein the base station comprises a 5G base station for 5G communications.

9. A base station comprising:
    a central transceiver unit (CTU) that includes a plurality of transceiver cores and a substrate;
    a printed circuit board (PCB) to support the substrate, wherein the substrate is between the plurality of transceiver cores and the PCB, and wherein the PCB comprises at least one transmission line; and
    at least one antenna unit coupled to the PCB with the at least one transmission line, the at least one antenna unit to transmit and receive communications at a frequency of approximately 4 GHz or higher.

10. The base station of claim 9 further comprising:
    a base station enclosure to enclose the base station and to position the at least one antenna unit near a periphery of the base station;
    at least one baseband circuitry; and
    network interface circuitry.

11. The base station of claim 10, wherein the at least one antenna unit is physically separated from the substrate of the CTU and the at least one antenna unit is capable of being plugged into a predefined interface of the PCB.

12. The base station of claim 9, wherein the plurality of transceiver cores are located on a single transceiver die.

13. The base station of claim 9, wherein the plurality of transceiver cores are located on a plurality of transceiver dies.

14. The base station of claim 9 wherein the at least one antenna unit to transmit and receive communications at a frequency of approximately 24 GHz or higher.

15. The base station of claim 9, further comprising:
a heat sink coupled to the plurality of transceiver cores, the heat sink to provide thermal management for the plurality of transceiver cores of the CTU.

16. The base station of claim 9, wherein the base station comprises a 5G base station for 5G communications.

17. A computing device comprising:
at least one processor to process data; and
a communication module or chip coupled to the at least one processor, the communication module or chip comprises,
a central transceiver unit (CTU) that includes a plurality of transceiver cores and a substrate;
a printed circuit board (PCB) to support the substrate, wherein the substrate is between the plurality of transceiver cores and the PCB, and wherein the PCB comprises at least one transmission line; and
at least one antenna unit coupled to the PCB with the at least one transmission line, the at least one antenna unit to transmit and receive communications at a frequency of approximately 4 GHz or higher.

18. The computing device of claim 17 further comprising:
an enclosure to enclose the computing device and to position the at least one antenna unit near a periphery of the computing device;
at least one baseband circuitry; and network interface circuitry.

19. The computing device of claim 18, wherein the at least one antenna unit is physically separated from the CTU and the at least one antenna unit is capable of being plugged into a predefined interface of the PCB.

20. The computing device of claim 17 wherein the at least one antenna unit to transmit and receive communications at a frequency of approximately 24 GHz or higher.

21. The computing device of claim 17, further comprising:
a heat sink coupled to the plurality of transceiver cores, the heat sink to provide thermal management for the plurality of transceiver cores of the CTU.

22. The computing device of claim 17, wherein the computing device comprises a 5G base station for 5G communications.

23. The computing device of claim 17, wherein the at least one transmission line comprises a grounded coplanar waveguide.

* * * * *